J. HAINES & L. KOHLER.
FLAX BREAKING MACHINE.
No. 40,621. Patented Nov. 17, 1863.
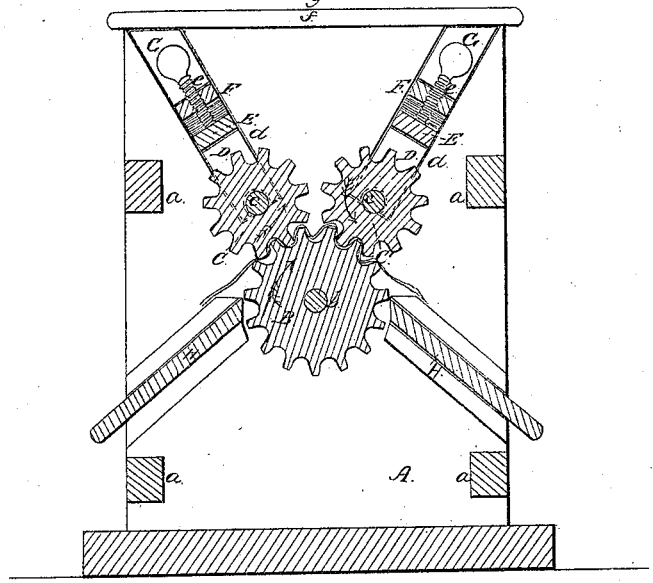
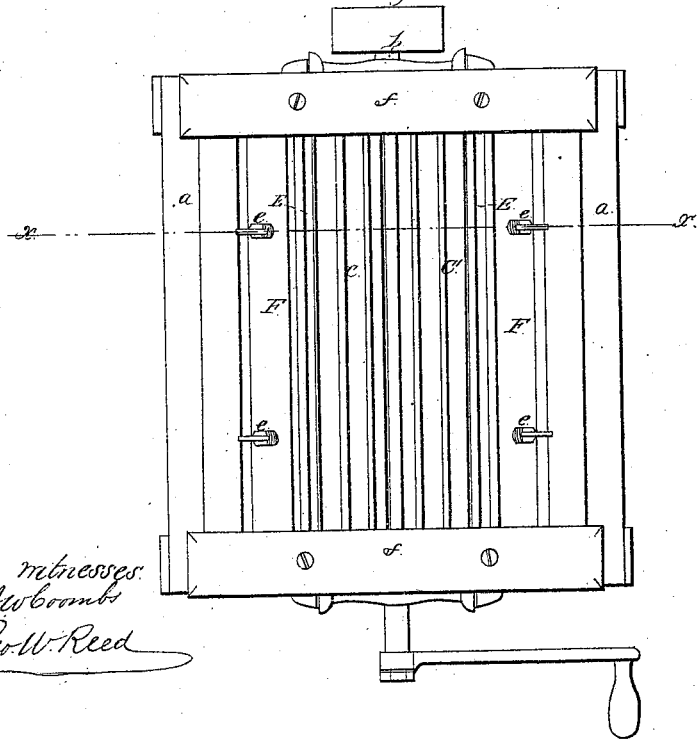

UNITED STATES PATENT OFFICE.

JACOB HANES AND LUKAS KOHLER, OF MILLERSBURG, INDIANA.

IMPROVEMENT IN FLAX-BREAKING MACHINES.

Specification forming part of Letters Patent No. 40,621, dated November 17, 1863.

*To all whom it may concern:*

Be it known that we, JACOB HANES and LUKAS KOHLER, of Millersburg, in the county of Elkhart and State of Indiana, have invented a new and Improved Flax-Brake; and we do hereby declare that the following is a full, clear, and exact description of the same, reference being had to the accompanying drawings, making a part of this specification, in which—

Figure 1 is a side sectional view of our invention, taken in the line $x\,x$, Fig. 2; Fig. 2, a plan or top view of the same.

Similar letters of reference indicate corresponding parts in the two figures.

This invention consists in the employment or use of three fluted rollers, one of which has its shaft fitted in permanent or stationary bearings, the shafts of the other two being fitted in sliding bearings arranged with springs and set-screws in such a manner as to cause the rollers to operate in the most efficient manner in breaking the flax.

The invention also consists in a novel manner of arranging or placing the sliding bearings in the frame of the machine, and in the employment or use of two feed-boards arranged relatively with the lower roller in such a manner as to admit of the flax being fed into the machine at either of two opposite sides.

To enable those skilled in the art to fully understand and construct our invention, we will proceed to describe it.

The frame of the machine is composed of two vertical sides, A A, connected at a suitable distance apart by cross-pieces $a$, and B C C' are three fluted rollers which are placed horizontally in the frame. The shaft $b$ of the roller B has its bearings in the sides A of the frame, said bearings being permanent or fixed. The rollers C C' have their shafts $c\,c'$ in a horizontal plane above the roller B, and at opposite sides of a vertical line passing through its center, as shown clearly in Fig. 1. The rollers C C' both gear into the roller B, and the shafts $c$ have their bearings in slides D, which are fitted in grooves $d$ made in the inner surfaces of the sides A A in a direction radial with the roller B, as shown in Fig. 1. The bearings D of each roller C C' are connected by a cross-bar, E, which bear against set-screws $e$, the latter passing through bars F, the ends of which are attached to removable slides G, fitted in the grooves $d$. The slides G are prevented from rising in the grooves $d$ by means of caps or strips $f\,f$, which are screwed one on the top of each side A.

From the above description it will be seen that the two rollers C C' may be removed from the frame at any time by detaching the caps $f$, withdrawing the slides G and bars F, and therewith drawing the bars E, having the bearings D and rollers C C attached to them.

H H are two inclined feed-boards, which are fitted between the sides A A at opposite sides of the roller B, the upper ends of the feed-boards being on a level with the shaft $b$ of the roller B, as shown in Fig. 1. These fluted rollers and cross-bars may be either of wood or metal. The bearings D may be of any suitable metal. The shafts of the rollers are also of metal.

The operation is as follows: The roller B may be turned either by hand or other power, and the flax fed to the rollers on either feed-board H, according to the direction in which the roller B is turned. The rollers C C' may be adjusted nearer to or farther from the roller B, according to the amount of flax passing between the rollers, by adjusting the set-screws $e$, which serve as bearings for the bars E, the latter, as well as the bars F, having a certain degree of elasticity to admit of the rollers C C' yielding to conform to the inequalities of the thickness of the layer of flax passing between them and roller B. In Fig. 1 the flax is shown, passing between the rollers, in red, and the direction in which the rollers rotate is indicated by the arrows upon them. By this arrangement flax may be operated upon rapidly and in the most efficient manner to separate the woody substance from the fiber.

Having thus described our invention, what we claim as new, and desire to secure by Letters Patent, is—

The combination of the fluted roller B C C', elastic bars E F, slides D, set-screws $e\,e$, and feed-boards H H, all arranged to operate as and for the purpose herein set forth.

JACOB HANES.
LUKAS KOHLER.

Witnesses:
HENRY DICK,
WESLEY HAGARY.
PETER BEHLER.